Figures 1, 2:
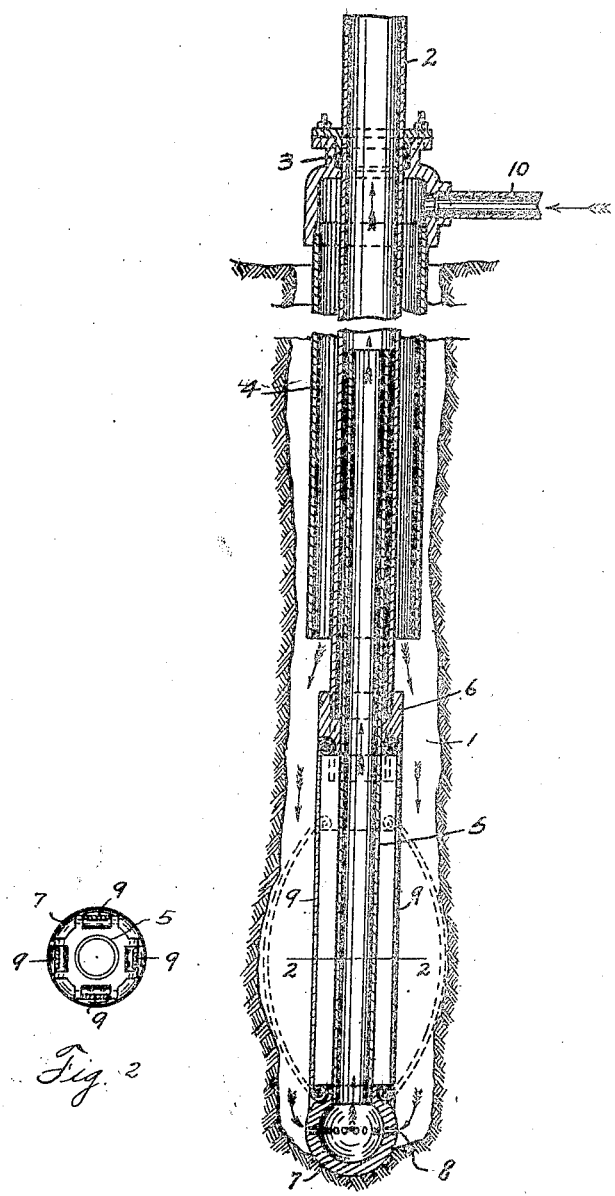

D. A. CARDEN.
WELL BORING APPARATUS.
APPLICATION FILED FEB. 10, 1919.

1,317,350.

Patented Sept. 30, 1919.

Inventor
David A. Carden

By
Attorneys

UNITED STATES PATENT OFFICE.

ERNEST A. WILDMAN, OF INDIANAPOLIS, INDIANA, ASSIGNOR TO PARKE DAVIS & COMPANY, OF DETROIT, MICHIGAN, A CORPORATION.

ALKAMIN ESTERS OF ALKOXY-AMINO-BENZOIC ACIDS AND OTHER SIMILAR COMPOUNDS OF SAID ACIDS.

1,317,250.     Specification of Letters Patent.     Patented Sept. 30, 1919.

No Drawing.     Application filed July 29, 1918. Serial No. 247,313.

*To all whom it may concern:*

Be it known that I, ERNEST A. WILDMAN, a citizen of the United States, residing at Indianapolis, Marion county, and State of Indiana, have invented and discovered certain new and useful Improvements in Alkamin Esters of Alkoxy-Amino-Benzoic Acids and other Similar Compounds of Said Acids, of which the following is a specification.

My invention relates to alkamin esters of alkoxy-amino-benzoic acids and similar compounds or derivatives of said acids.

The object of the invention is the production of synthetic substances having the property of producing local anesthesia, while at the same time being characterized by their small degree of irritation when applied to the tissues and by lower toxicity than any other of the substances commonly used as local anesthetics.

The invention may be broadly stated to comprise anesthetic compounds derived from di-substituted benzoic acids in which the essential substituents are the atomic aggroupments $-NH_2$ and $-OR$, in which R is any alkyl radical, which products may be represented by substantially the following formula:

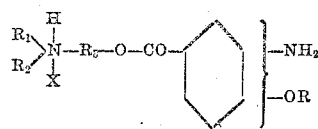

in which $R_3$ is any bivalent hydrocarbon radical. $R_1$ and $R_2$ are alkyl radicals which may be alike or different, and X is a halogen atom, the $-NH_2$ and $-OR$ groups, in which R is any alkyl radical, being situated in any position in the benzene ring. Specific embodiments of the invention are alkamin esters of alkoxy-amino-benzoic acids, particularly alkamin esters of amino-anisic acids and salts of said esters.

The alkamin esters of alkoxy-amino-benzoic acids are colorless, solids or viscous oils solidifying at low temperature, as a rule readily soluble in the usual organic solvents, such as ether, alcohol, acetone, and benzene; only slightly soluble in water and such solution having an alkaline reaction to litmus. On heating with mineral acids or alkalis, the alkamin esters are hydrolyzed with the formation of an alkamin and an alkoxy-amino-benzoic acid. The alkamin esters form salts with one equivalent of an acid which salts are soluble in water with a neutral reaction to litmus.

A specific example of the alkamin esters belonging to this series is meta-aminoanisoyldiethylaminoethanol, having the formula:

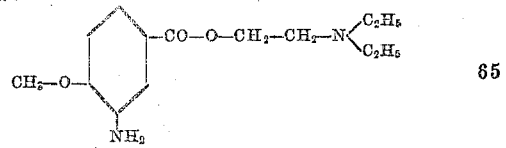

which may be prepared as follows: Equal molecular proportions of meta-nitroanisoyl chlorid and diethylaminoethanol are mixed upon which they react according to the equation:

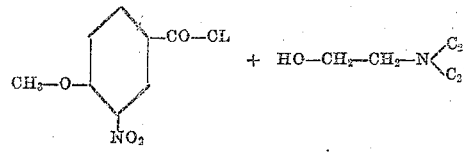 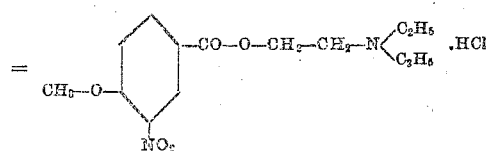

forming the hydrochlorid of meta-nitroanisoyldiethylaminoethanol as indicated. Ten parts by weight of the latter substance are dissolved in a mixture of twenty-five parts by weight of hydrochloric acid (sp. gr. 1.2) and twenty parts by weight of alcohol, and the solution treated with twelve parts by weight of granulated tin, keeping the temperature at about 35°.

The reaction progresses rapidly and is complete when there is no further tendency to warm itself spontaneously. A colorless solution is obtained from which the tin is removed by precipitation with hydrogen sulfid. On addition of sodium carbonate solution, meta-aminoanisoyldiethylaminoethanol separates as an oil. When treated with one equivalent of hydrochloric acid it forms a hydrochlorid which is readily soluble in water with a neutral reaction and crystallizes from a mixture of absolute alcohol and ether in colorless crystals melting at 160° centigrade.

In an analogous manner other alkamin esters of meta-aminoanisic acid and other salts thereof may be obtained, and also the esters of salts of the ortho- or para-aminomethoxybenzoic acids, and also the other esters and salts of other alkoxy-amino-benzoic acids.

Having thus described my invention, what I claim is:—

1. Anesthetic compounds derived from di-substituted benzoic acids in which the essential substituents are the atomic ag-groupments —NH$_2$ and —OR, in which R is any alkyl radical.

2. Alkamin esters of di-substituted benzoic acids in which the substituents —NH$_2$ and —OR, where R is any alkyl radical, may be located in any positions in the benzene ring.

3. The products represented by substantially the following formula:

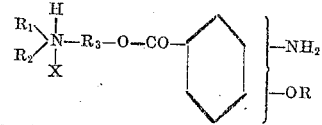

in which R$_3$ is any bivalent hydrocarbon radical, R$_1$ and R$_2$ are alkyl radicals which may be alike or different, and X is an acid anion, the —NH$_2$ and —OR groups, in which R is any alkyl radical, being situated in any position in the benzene ring.

4. Alkamin esters of amino-anisic acids.

5. As new products, the alkamin esters of meta-aminoanisic acids being colorless compounds, solids or viscous oils solidifying at low temperature, as a rule readily soluble in the usual organic solvents, slightly soluble in water with an alkaline reaction to litmus, decomposed when heated with acids or alkalis with formation of an alkamin and meta-aminoanisic acid, forming salts soluble in water with a neutral reaction which produce local anesthesia with a relatively small degree of irritating or toxic action.

6. As a new product, the alkamin ester meta-aminoanisoyldiethylaminoethanol being a colorless oil, readily soluble in the usual organic solvents, slightly soluble in water with an alkaline reaction to litmus, decomposed when heated with hydrochloric acid or sodium hydroxid, into diethylaminoethanol and meta-aminoanisic acid, forming a salt with one equivalent of hydrochloric acid which crystallizes from a mixture of absolute alcohol and ether in colorless crystals melting at 160° centigrade and forms aqueous solutions of neutral reaction which produce local anesthesia with a relatively small degree of irritating or toxic action.

In witness whereof, I have hereunto set my hand and seal at Indianapolis this 8th day of July A. D. nineteen hundred and eighteen.

ERNEST A. WILDMAN. [L. S.]

Witnesses:
HAROLD GRAY,
ARTHUR L. WALTERS.